United States Patent
Kipnis

(10) Patent No.: US 12,068,664 B1
(45) Date of Patent: Aug. 20, 2024

(54) ENERGY GENERATING SYSTEM

(71) Applicant: Cyclazoom, LLC, Skokie, IL (US)

(72) Inventor: Michael Kipnis, Skokie, IL (US)

(73) Assignee: Cyclazoom, LLC, Skokie, IL (US)

( * ) Notice: Subject to any disclaimer, the term of this patent is extended or adjusted under 35 U.S.C. 154(b) by 0 days.

(21) Appl. No.: 18/586,755

(22) Filed: Feb. 26, 2024

(51) Int. Cl.
H02K 7/18 (2006.01)

(52) U.S. Cl.
CPC ................. *H02K 7/1869* (2013.01)

(58) Field of Classification Search
CPC .................................................. H02K 7/1869
USPC .................... 290/1 R, 42, 53, 54, 43, 44, 55
See application file for complete search history.

(56) References Cited

U.S. PATENT DOCUMENTS

| | | | | |
|---|---|---|---|---|
| 3,696,251 | A * | 10/1972 | Last | H02K 35/00 310/15 |
| 11,619,202 | B1 | 4/2023 | Nydegger | |
| 2004/0251692 | A1 * | 12/2004 | Leijon | F03B 13/1885 290/42 |
| 2006/0220385 | A1 * | 10/2006 | Stanciu | F03G 3/091 290/1 R |
| 2007/0090652 | A1 * | 4/2007 | Leijon | F03B 13/189 290/53 |
| 2009/0085357 | A1 * | 4/2009 | Stewart | F03B 13/20 290/53 |
| 2010/0117367 | A1 * | 5/2010 | Muller | H02K 3/47 290/53 |
| 2013/0127167 | A1 * | 5/2013 | Dore | H02K 35/02 290/53 |
| 2013/0147198 | A1 * | 6/2013 | Leijon | H02K 5/12 29/596 |
| 2013/0313838 | A1 * | 11/2013 | Sakamoto | H02K 35/04 290/1 R |
| 2014/0117674 | A1 * | 5/2014 | Phillips | H02K 35/02 290/53 |
| 2015/0145258 | A1 * | 5/2015 | Phillips | H02K 35/02 248/610 |
| 2023/0184229 | A1 | 6/2023 | Pedretti | |

* cited by examiner

*Primary Examiner* — Charles Reid, Jr.
(74) *Attorney, Agent, or Firm* — Brian Roffe

(57) ABSTRACT

Energy generating system that generates energy from an external source includes a frame having two vertically spaced apart supports and at least one rod extending therebetween. An electromagnetic power generating arrangement is between the supports and includes a movable power generating coil, a first stationary power generating coil that interacts with the movable coil at an upper position in an upward path of movement of the movable coil, and a second stationary power generating coil that interacts with the movable coil at a lower position in a downward path of movement of the movable coil to generate electricity which is conveyed through a cable to an electricity processing system. The movable coil is connected to each rod, and the movable coil is lifted from the lower position to the upper position along each rod, ideally through energy from an external source.

20 Claims, 5 Drawing Sheets

ENERGY GENERATING SYSTEM

FIELD OF THE INVENTION

The present invention relates to an energy generating system that is used to generate energy, specifically electricity, at least in part from one or more external energy sources, e.g., sun power, wind power or wave power.

BACKGROUND OF THE INVENTION

Power generation from renewable energy sources (e.g., wave energy, solar power, wind power, hydroelectric power, biomass, etc.) continues to grow. However, many of these renewable energy sources (e.g., solar power, wind power) are intermittent and unpredictable, limiting the amount of electricity that can be delivered to the grid from intermittent renewable energy sources.

Accordingly, there is a need for improved system to capture electricity generated by renewable energy sources when available for predictable delivery to the electrical grid. As used herein, the electrical grid is an interconnected network for delivery of electricity from producers to consumers and spans a large geographical region, including cities, states and/or countries.

U.S. Pat. Appln. Publ. No, 20230184229 (Pedretti) addresses this issue and describes an energy storage and delivery system that includes an elevator cage operable to move one or more blocks from a lower elevation to a higher elevation to store energy (e.g., via the potential energy of the block in the higher elevation) and operable to move one or more blocks from the higher elevation to the lower elevation (e.g., by gravity) to generate electricity (e.g., via the kinetic energy of the block when moved to the lower elevation). The blocks are moved between the lower elevation and the higher elevation by an equal vertical distance.

U.S. Pat. No. 11,619,202 (Nydegger) describes systems and methods for controlling machines that generate electricity using a source of renewable energy, namely gravity. An electro-magnetic subsystem of the machine harvests kinetic energy of a buoyant shuttle as it falls through air and into a bi-level tank. The shuttle is then arrested in the bi-level water tank and returned, by virtue of the shuttle's buoyancy, to its start point for a subsequent duty cycle. The return of the shuttle is made possible by a hydro-pneumatic subsystem of the machine that overcomes the potential energy needed to raise and lower the upper water level in the bi-level tank to compensate for a transit of the shuttle through the tank. The hydro-pneumatic subsystem does this by cyclically maintaining the required difference in water levels in the bi-level tank.

OBJECTS AND SUMMARY OF THE INVENTION

It is an object of at least one embodiment of the present invention to provide new and improved energy generating and/or storage system.

It is an object of at least one embodiment of the present invention to provide new and improved energy generating and/or storage system that generates energy, specifically electricity, at least in part from one or more external energy sources.

It is another object of at least one embodiment of the present invention to provide new and improved energy generating and/or storage system that generates energy, specifically electricity, at least in part from one or more passive external energy sources when available to generate energy for use when they are not available.

It is an object of at least one embodiment of the present invention to provide new and improved energy generating and/or storage system that is capable of storing energy during a period of availability for use when no longer available.

It is an object of at least one embodiment of the present invention to provide new and improved energy storage system that is capable of storing energy during a period of relatively inexpensive generation and output the stored energy during a period of more expensive generation to capture the difference in cost based on the time differential.

In order to achieve one or more of these objects, and possibly others, an energy generating system that generates energy from an external source includes a frame having a first support, a second support spaced apart from the first support and at least one rod extending between the first and second supports. The system also includes an electromagnetic power generating arrangement between the first and second supports, which includes a movable power generating coil, a first stationary power generating coil that interacts with the movable power generating coil at an upper position in an upward path of movement of the movable power generating coil, and a second stationary power generating coil that interacts with the movable power generating coil at a lower position in a downward path of movement of the movable power generating coil to generate electricity which is conveyed through a cable to an electricity processing system. The movable power generating coil is connected to each rod, and the movable power generating coil is lifted from the lower position to the upper position along each rod.

In one embodiment, there are a pair of rods, in which case, there is advantageously a sleeve bearing on each rods and a bracket connecting the movable power generating coil to the sleeve bearings. A weight is preferably provided on the brackets. There may be springs between the first and second stationary power generating coils and the frame.

The structure that provides the lifting of the movable power generating coil, i.e., lifting means, includes an electrically-powered lifting coil extending between the first and second stationary power generating coils. The lifting coil extends through the movable power generating coil and interacts with the movable power generating coil to contribute to raising of the movable power generating coil from the lower position to the upper position.

Alternatively, the lifting means may include a wind-based system that deploys a blade or sail when the upward movement of the movable power generating coil is desired.

The structure that connects the movable power generating coil to the rod(s) may be at least partly buoyant, in which case, the lifting means include a wave-based system wherein a wave causes the upward movement of the connecting means and thus the movable power generating coil. The structure that connects the movable power generating coil to the rod(s) may also be at least one coil, and a bracket connecting each coil to the movable power generating coil. In this latter case, the lifting means include an electrically-powered lifting coil arranged around each rod and inward of the coil of the connecting means. Each lifting coil interacts with the coil of the connecting means to contribute to raising of the movable power generating coil connected to the coil from the lower position to the upper position. As mentioned before, a weight on each bracket is advantageous.

Another embodiment of an energy generating system that generates energy from an external source includes a central axle, a circular cover having an opening on one side through which the axle passes into an interior of the cover, at least one bearing for mounting the cover to the axle to enable rotation of the axle relative to the cover, and an electromagnetic power generating arrangement in the interior space of the cover. The electromagnetic power generating arrangement includes a movable power generating coil arranged on the axle, a first stationary power generating coil that interacts with the movable power generating coil at an upper position in a circular rotational path of movement of the movable power generating coil, and a second stationary power generating coil that interacts with the movable power generating coil at a lower position in the circular rotational path of movement of the movable power generating coil to generate electricity which is conveyed through a cable to an electricity processing system. Structure is provided to assist in rotational movement of the movable power generating coil from the lower position to the upper position, referred to as lifting means.

In one embodiment, there are struts extending radially from the axle, in which case, the movable power generating coil is connected to one of the struts. A weight may be connected to the movable power generating coil. The lifting means may include an electrically-powered lifting coil arranged in the interior space of the cover on a side at which the movable power generating coil is in an upward rotational path and which interacts with the movable power generating coil and contributes to continued upward rotational movement of the movable power generating coil to the upper position.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
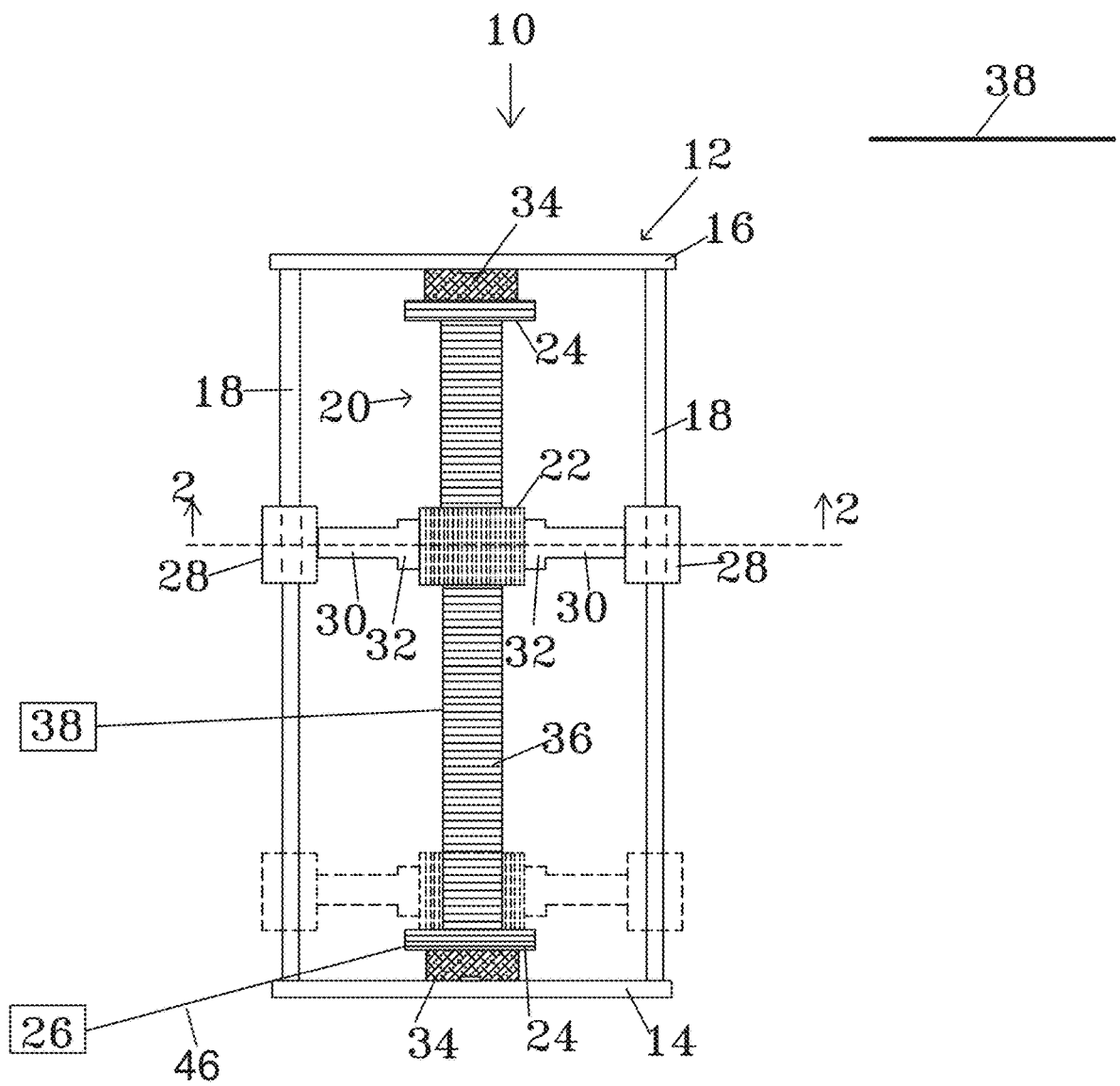
FIG. 1 is a front view of a first embodiment of an energy generating device in accordance with the invention.
Figure 2:
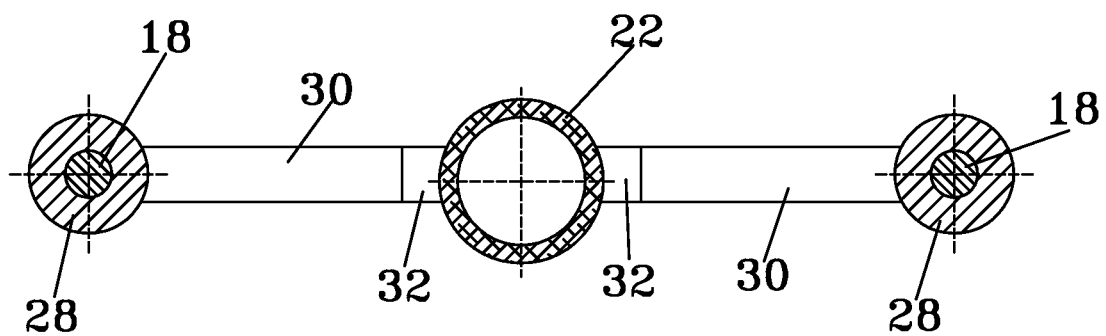
FIG. 2 is a cross-section taken along the line 2-2 in FIG. 1.

Referring to the accompanying drawings wherein the same reference numbers refer to the same or similar components, an energy generating system 10 in accordance with the invention is shown in FIGS. 1 and 2 and includes a frame 12 having a base 14, an upper frame part 16 and one or more directional poles or vertical rods 18 extending between the base 14 and the upper frame part 16. As shown in FIG. 1, the energy generating system 10 has two vertical rods but any number of vertical rods can be used in various embodiments of the invention. The base 14 may be considered a first support and the upper frame part 16 may be considered a second support, or vice versa, with the base 14 being spaced apart from the upper frame part 16 as shown in FIG. 1, whereby the rod(s) 18 thus extend between the first and second supports.

A power (electricity) generating arrangement 20 is arranged between the upper surface of the base 14 and the lower surface of the upper frame part 16, and includes a movable power generating coil 22 and two stationary power generating coils 24. The movable power generating coil 22 and two stationary power generating coils 24 cooperate during the downward movement of the movable power generating coil 22 to generate electricity which is conveyed through a cable 46 from the lowermost stationary power generating coil 24 to an electricity processing system 26 that processes the generated electricity (see FIG. 1). The manner in which two coils, with one moving relative to the other, generate electricity is well-known to those skilled in the art to which this invention pertains. The movable power generating coil 22 in its lowermost position is shown in dotted lines in FIG. 1.

The electricity generated is dependent on the difference in height between the location of the movable power generating coil 22 when at its uppermost position at least partly around the uppermost stationary power generating coil 24 and the location of the movable power generating coil 22 when at its lowermost position at least partly around the lowermost stationary power generating coil 24. The difference is potential energy (PE) which is a function of the mass of the movable power generating coil 22, the height of the object and gravity.

The movable power generating coil 22 is connected to each sleeve bearing 28 that slides along a respective one of the vertical rods 18 by connecting means, which as shown include a respective transverse connecting bracket 30, although other means for connecting the movable power generating coil 22 to the vertical rods 18 are possible and contemplated by the inventor herein. The vertical rods 18 therefore guide the downward movement of the movable power generating coil 22. The connecting brackets 30 may be weighted, and to this end have a weight 32 at the end adjacent and connecting to the movable power generating coil 22. The vertical rods 18 may be solid and rigid. Suitable bearings or lubricants are optionally provided between the vertical rods 18 and the sleeve bearings 28 that move along the vertical rods 18.

The power generating arrangement 20 also includes two springs 34 that each connect the stationary power generating coils 24 to the base 14 or upper frame part 16. The spring 34 below the lower stationary power generating coil 24 is useful since it can provide a return force aiding in the upward movement of the movable power generating coil 22.

To enable repeated operation, the movable power generating coil 22 must be raised to its uppermost position. This upward movement is started by the return force provided by the spring 34 below the lower stationary power generating coil 24 but this is often insufficient. As such, a lifting coil 36 is provided, extending between the upper and lower stationary power generating coils 24, and interacts with the movable power generating coil 22 to raise the movable power generating coil 22 slowly to its uppermost position.

Electricity to power the lifting coil 36 can come from the electricity generated during the downward movement of the movable power generating coil 22, via the electricity processing system 26. However, additional power can be used to raise the movable power generating coil 22 upward along the lifting coil 36. As such, an external, renewable source of energy is provided. This energy source is depicted generally as 38 and may be a solar power system on the frame 12, or elsewhere. Construction, installation, and use of such a solar power system is well-known in the field to which this invention pertains, and additional details are not necessary. The schematic of a solar power system conveys the presence of one or more solar panels or other type of system that use solar energy to generate electricity of the connection of the energy source 38 to the lifting coil 36 conveys the ability to transfer the generated electricity to the lifting coil 36 to enable it to lift the movable power generating coil 22 upward as a result of solar-generated energy.

Alternatively, instead of using the lifting coil 36, a system may be provided to lift the movable power generating coil 22. Such a system may be a wind-based system that deploys a blade or sail when the upward movement of the movable power generating coil 22 is wanted (and sufficient wind is present) to cause the wind to raise the movable power generating coil 22.

Instead of the lifting coil 36, the movable power generating coil raising system may be implemented by a wave-based system wherein the brackets 30 are made to be buoyant so that in the absence of a wave at the location of the energy generating system 10 in the region between the stationary power generating coils 24, the movable power generating coil 22 would drop by the effect of gravity, but when a wave is present the buoyancy of the brackets 30 would cause the raising of the movable power generating coil 22.

Thus, the manner in which movable power generating coil 22 is raised is not critical to the invention, although ideally it should be effected through a renewable power source.

Figure 3:
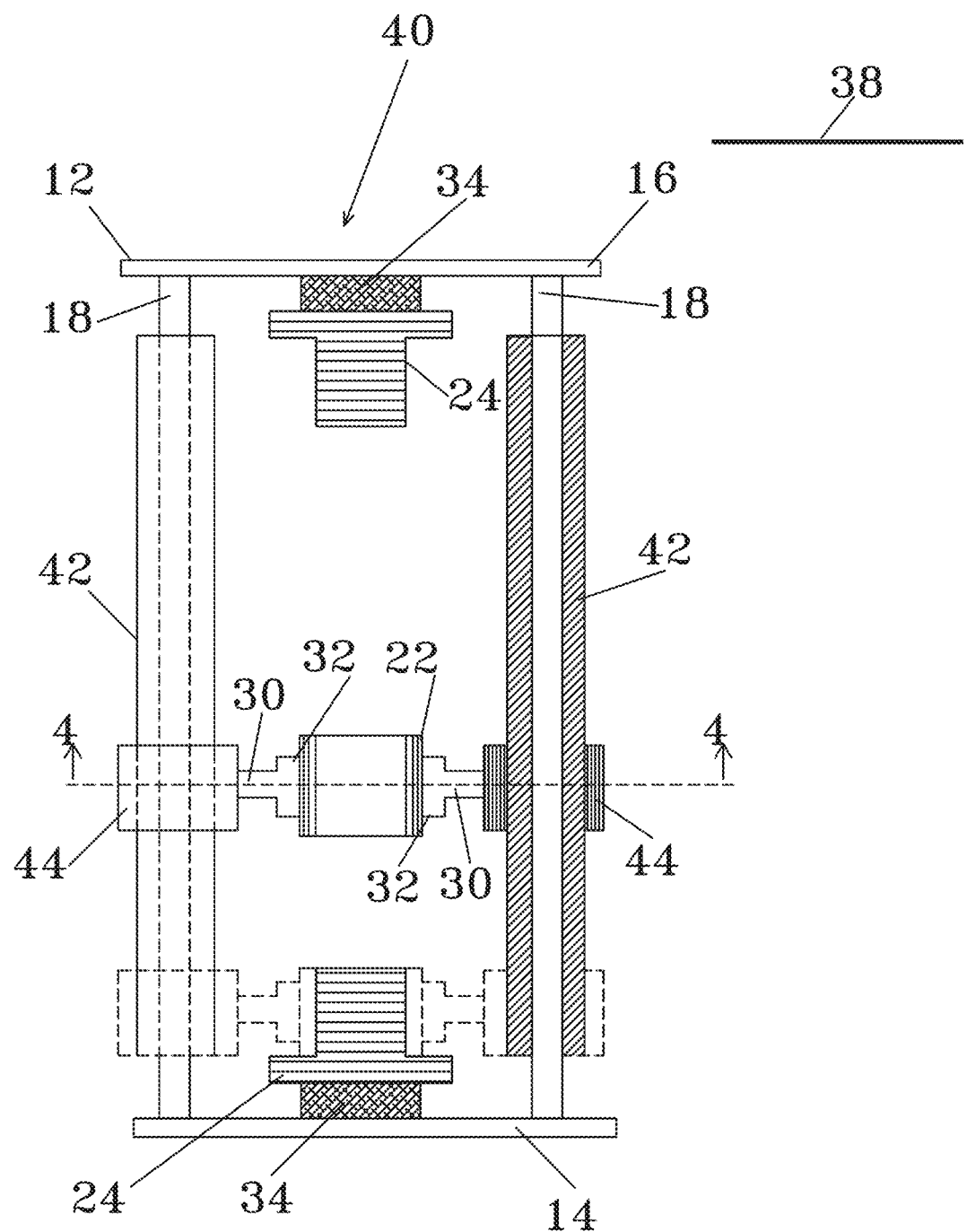
FIG. 3 is a front view of a second embodiment of an energy generating device in accordance with the invention.
Figure 4:
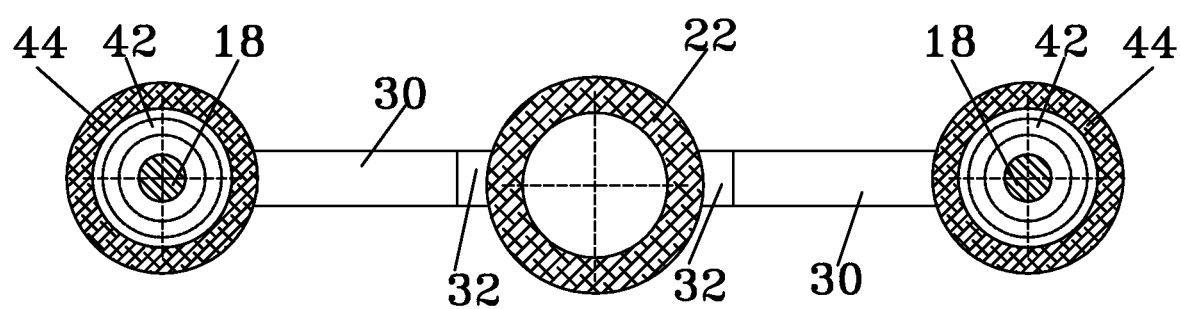
FIG. 4 is a cross-section taken along the line 4-4 in FIG. 3.

FIGS. 3 and 4 show another embodiment of an energy generating system 40 in accordance with the invention wherein the lifting coil 36 is not in the center of the system as in the embodiment of FIGS. 1 and 2, but rather is on both sides of the energy generating system 40. Each lifting coil 42 is around a respective directional pole or vertical rod 18 and connected by a sleeve bearing 44 to the movable power generating coil 22. The movable power generating coil 22 is in its lowermost position is shown in dotted lines in FIG. 3. The sleeve bearings 44 are electromagnetic coils so that electricity is directed to the lifting coils 42 to interact with the sleeve bearings 44 and cause the lifting of the movable power generating coil 22 connected thereto.

Both energy generating systems 10, 40 function in almost the same way in that they generate electricity during the downward movement of the movable power generating coil 22. The electricity is based on the realization that the potential energy of the movable power generating coil 22 and weighted brackets 30 is greater when the movable power generating coil 22 and weighted brackets 30 are adjacent the upper frame part 16 than when the movable power generating coil 22 and weighted brackets 30 are adjacent the base 14, and also that the velocity at which the movable power generating coil 22 and weighted brackets 30 are lowered from the uppermost position to the lowermost position is greater than the velocity at which the movable power generating coil 22 and weighted brackets 30 are raised from the lowermost position to the uppermost position. Assuming constant mass, the different velocities result in different kinetic energies (kinetic energy equal mass times velocity squared divided by two or $mv^2/2$).

As mentioned above, the energy used to raise the movable power generating coil 22 and weighted brackets 30 from the lowermost position to the uppermost position may be provided, at least in part, by the system 10, 40. However, to supplement or replace this energy, solar panels (not shown) may be attached to the upper frame part 16 to generate electricity used to raise the movable power generating coil 22 and weighted brackets 30 from the lowermost position to the uppermost position.

In one embodiment, the systems 10, 40 are positioned to enable wave energy to lift the movable power generating coil 22 and weighted brackets 30 from the lowermost position to the uppermost position. That is, ocean water subject to wave motion is guided into engagement with the movable power generating coil 22 and weighted brackets 30 and as the tide rises or waves rise, the movable power generating coil 22 and weighted brackets 30 is lifted. The lowering of the movable power generating coil 22 and weighted brackets 30 thus converts the upward wave or tide-derived energy into electricity.

Figures 5, 6:
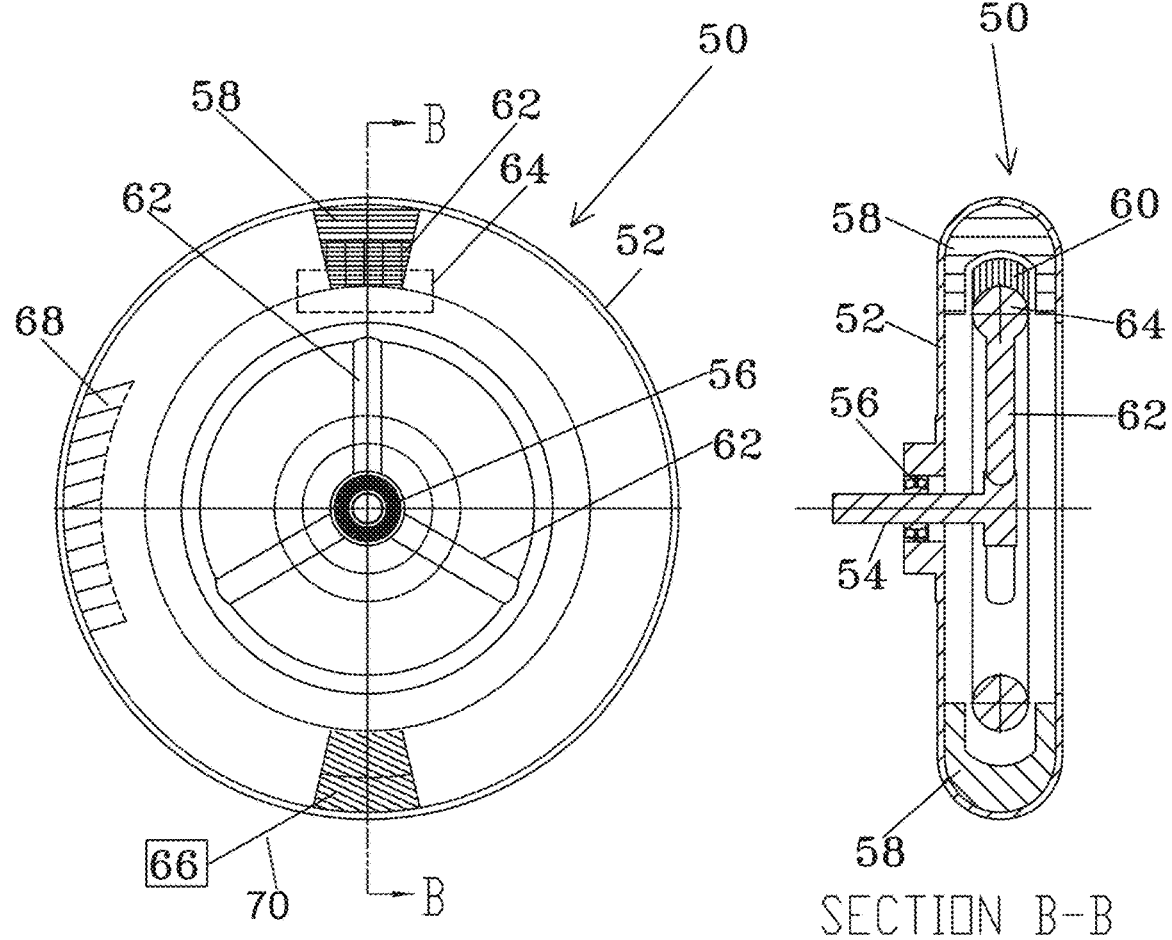
FIG. 5 is a front view of a third embodiment of an energy generating device in accordance with the invention.
FIG. 6 is a cross-section taken along the line 6-6 in FIG. 5.

FIGS. 5 and 6 show another energy generating system 50 wherein the same concept of raising a weighted movable power generating coil at least partly by external means, such as solar power, wind power or wave power, and lowering it to cause interaction between the movable power generating coil and a stationary power generating coil to generate electricity. In this embodiment, instead of linear movement of the movable power generating coil, there is circular movement.

FIG. 5 shows the energy generating system 50 including a circular cover 52 around a rotatable central axle 54, the central axle extending to one side of the cover 52 and passing through an opening on one lateral side of the cover 52. The axle 54 rotates, in this embodiment, clockwise, to cause a portion connected thereto and inside of the cover 52 to rotate within the interior space of the cover 52. One or more bearings 56 is/are attached between the cover 52 and the axle 54 to enable the cover 52 to be maintained in a stationary state relative to the axle 54, the cover 52 being connected to one part of the bearing 56 with the other part being connected to the axle 54. The construction of such bearings is well-known to those skilled in the art to which this invention pertains.

Inside an interior space defined by the cover 52, there are two stationary power generating coils 58, one at the top of the interior space in the cover 52 and the other at the bottom of the interior space in the cover 52 (see FIG. 5). The power generating coils 58 have a U-shaped cross-section (see FIG. 6).

A movable power generating coil 60 is connected to one of the struts 62, three being shown but this number is not limiting, which struts 62 extend radially from a portion of the axle 54 inside of the interior space of the cover 52. A weight 64 is preferably connected to the movable power generating coil 60, inside of the strut 62 that supports the movable power generating coil 60, or formed integral with the strut 62 that supports the movable power generating coil 60. Movement of the power generating coil 60 during its rotation about the axle 54 causes electricity to be generated as it passes by the stationary power generating coils 58. This electricity is conveyed through cables 70 to an electricity processing system 66 that processes the generated electricity (see FIG. 5). As mentioned above, the manner in which two coils, with one moving relative to the other, generate electricity is well-known to those skilled in the art to which this invention pertains.

A lifting coil 68 is arranged on a side of the interior of the cover 52 in an upward path of the movable power generating coil 60. In view of the clockwise rotation of the axle 54 and its connected structure, the lifting coil 68 is arranged on the left side of the cover 52. The lifting coil 68 has an arcuate surface against the inside surface of the cover 52 and extends radially inward a sufficient distance to enable electrical interaction with the movable power generating coil 60, but without being an obstacle to the rotational movement of the movable power generating coil 60.

In operation, when the movable power generating coil 60 descends from engagement with the upper stationary power generating coil 58 (the position shown in FIGS. 5 and 6), it passes by the lower stationary power generating coil 58 and continues its circular movement into engagement with the lifting coil 68. The lifting coil 68 is energized to power the movable power generating coil 60 to continue its upward rotational movement to return to the uppermost position in engagement with the upper stationary power generating coil 58. This cycle repeats causing electricity to be generated during the descending movement of the movable power generating coil 60.

To provide electricity to the lifting coil 68, in order to cause the raising of the movable power generating coil 60 and weight 64 from the lowermost position to the uppermost position, electricity generated during the descent of the movable power generating coil 60 may be used. This electricity may not be sufficient and in fact, an external source of electricity is preferred to energize the lifting coil 68.

This external source of electricity may be provided, at least in part, by solar panels (not shown) attached to the cover 52 to generate electricity used to energize the lifting coil 68 and thereby raise the movable power generating coil 60 and weight 64 from the lowermost position to the uppermost position.

In one embodiment, the systems 50 is positioned to enable pre-existing rotational energy to be switched into the axle 54 during the upward movement of the movable power generating coil 60 to thereby use this pre-existing rotational movement to enable the movable power generating coil 60 to continue its upward movement to a position engaging with the upper stationary power generating coil 58.

Energy generating system 50 could therefore be installed onto the axle of a motorized vehicle or manually-powered vehicle, e.g., bicycle, and the rotation of the axle of any of these vehicles switched to cause engagement of the axle 54 of the energy generating system 50 to the axle of the vehicle during the upward movement of the movable power generating coil 60. A switch could be a mechanical structure that detects the upward movement of the movable power generating coil 60 and causes provides for a mechanical connection between the axle of the vehicle and the axle of the energy generating system 50 to enable transfer of rotational force. This may take the form of a gear on the axle 54 that is selectively moved into engagement with a gear on the axle of the vehicle, and disengaged with the axle of the vehicle once the movable power generating coil 60 has reached the uppermost position or close to it once it engages with the upper stationary power generating coil 58.

Another use for the energy generating system 10, 50 is as a storage of energy wherein during a period when the external source of energy is available, e.g., daylight in the event a solar powered external source is used, then the movable power generating coil 22, 60 could be brought to its upper position during daylight and held therein. The movable power generating coil 22, 60 is released from a stationary state at night to convert the stored potential energy into kinetic energy which results in electricity generation at night.

Providing multiple such systems could create a reservoir of energy to use when the external sources are not available. A controller would be coupled to the movable power generating coil 22, 60 to hold it through magnetic attraction, or electromagnetic force between the movable power generating coil 22, 60 and the upper stationary power generating coil 24, 58, in the upper position and only release it when power is needed.

Moreover, the energy storage could be used to use energy when it is relatively cheap to use and output the stored energy when the price is higher. Thus, electricity would be used to bring the movable power generating coil 22, 60 to its upper state when electricity is inexpensive (whether or not derived in part or entirely from external sources) and then the movable power generating coil released to generate electricity (from the stored potential energy) when the price obtained for the generated electricity is higher. A profit can be obtained in this manner using energy generating system 10, 50.

The foregoing provides multiples uses for the energy generating system disclosed herein. It is important, but not critical, that at least some of the energy is sourced from external sources, and specifically renewable sources that do not require energy themselves to create potential energy. Thus, solar power, wind power, wave energy and other existing power sources are useful external sources to cause the movable power generating coil 22, 60 to be brought or lifted to its upper state and then capable of generating useable energy during its downward path (linear or arcuate) while moving, i.e., kinetic energy.

The exact geometric form of the downward path of the movable power generating coil 22, 60 is not limited to the linear path as shown in FIGS. 1-4 or the arcuate path shown in FIGS. 5 and 6, but can take other forms. Similarly, the exact geometric form of the upward path of the movable power generating coil 22, 60 is not limited to the linear path as shown in FIGS. 1-4 or the arcuate path shown in FIGS. 5 and 6, but can take other forms. Different shapes for the downward and upward path may be employed in the embodiment.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Furthermore, the absence of structure in the drawings may be, in some embodiments, considered to indicate that such structure is intentionally lacking and omitted in an engine or other arrangement disclosed herein. The absence of such structure can, in some embodiments, provide benefits. The supercharger 10 is not limited to use with any specific fluid, whether air or water, and to any specific use. Finally, features of the above-identified prior art can be incorporated into the supercharger of the present invention, and the supercharger of the present invention applied in the application disclosed in the above-identified prior art to the extent the resultant combination does not deviate from the objectives and novelties of the invention.

The invention claimed is:

1. An energy generating system that generates energy from an external source, comprising:
   a frame having a first support, a second support spaced apart from said first support and at least one rod extending between said first and second supports;
   an electromagnetic power generating arrangement between said first and second supports, said electromagnetic power generating arrangement comprising:
   a movable power generating coil;
   a first stationary power generating coil that interacts with said movable power generating coil at an upper position in an upward path of movement of said movable power generating coil;

a second stationary power generating coil that interacts with said movable power generating coil at a lower position in a downward path of movement of said movable power generating coil to generate electricity which is conveyed through a cable to an electricity processing system;

connecting means for connecting said movable power generating coil to said at least one rod; and lifting means for lifting said movable power generating coil from the lower position to the upper position along said at least one rod.

2. The system of claim 1, wherein said at least one rod comprises a pair of rods, said connecting means comprising a sleeve bearing on each of said rods and a respective bracket connecting said movable power generating coil to each of said sleeve bearings.

3. The system of claim 2, further comprising a weight on each of said brackets.

4. The system of claim 1, further comprising springs between said first and second stationary power generating coils and said frame.

5. The system of claim 1, wherein said lifting means comprise an electrically-powered lifting coil extending between said first and second stationary power generating coils, said lifting coil extending through said movable power generating coil and interacting with said movable power generating coil to contribute to lifting of said movable power generating coil from the lower position to the upper position.

6. The system of claim 1, wherein said connecting means are at least partly buoyant and said lifting means comprise a wave-based system wherein a wave causes upward movement of said connecting means and thus said movable power generating coil from the lower position to the upper position along said at least one rod.

7. The system of claim 1, wherein said connecting means comprise at least one coil, and a respective bracket connecting each of said at least one coil to said movable power generating coil.

8. The system of claim 7, wherein said lifting means comprise a respective electrically-powered lifting coil arranged around each of said at least one rod and inward of said at least one coil of said connecting means, each said lifting coil interacting with said at least one coil of said connecting means to contribute to lifting of said movable power generating coil connected to said at least one coil from the lower position to the upper position.

9. The system of claim 7, further comprising a weight on each of said brackets.

10. An energy generating system that generates energy from an external source, comprising:

a central axle;

an electromagnetic power generating arrangement comprising:
 a movable power generating coil arranged on said axle;
 a first stationary power generating coil that interacts with said movable power generating coil at an upper position in a circular rotational path of movement of said movable power generating coil;
 a second stationary power generating coil that interacts with said movable power generating coil at a lower position in the circular rotational path of movement of said movable power generating coil to generate electricity which is conveyed through a cable to an electricity processing system;

at least one bearing for mounting said electromagnetic power generating arrangement to said axle to enable rotation of said axle relative to said electromagnetic power generating arrangement;

whereby said movable power generating coil is rotated from the lower position to the upper position at least partly via an external source.

11. The system of claim 10, further comprising struts extending radially from said axle, said movable power generating coil being connected to one of said struts.

12. The system of claim 10, further comprising a weight connected to said movable power generating coil.

13. The system of claim 10, further comprising lifting means for assisting in rotational movement of said movable power generating coil from the lower position to the upper position.

14. The system of claim 13, wherein said lifting means comprise an electrically-powered lifting coil arranged to interact with said movable power generating coil while it is in an upward rotational path and to contribute to continued upward rotational movement of said movable power generating coil to the upper position.

15. The system of claim 10, wherein said electromagnetic power generating arrangement comprises a circular cover having an opening on one side through which said axle passes into an interior of said cover, said at least one bearing mounting said cover to said axle to enable rotation of said axle relative to said cover.

16. The system of claim 15, wherein said lifting means comprise an electrically-powered lifting coil arranged in said interior space of said cover on a side at which said movable power generating coil is in an upward rotational path and interacting with said movable power generating coil and contributing to continued upward rotational movement of said movable power generating coil to the upper position.

17. An energy generating system that generates energy from an external source, comprising:

a frame having a first support, a second support spaced apart from said first support and at least one rod extending between said first and second supports; and an electromagnetic power generating arrangement between said first and second supports, said electromagnetic power generating arrangement comprising:
 a movable power generating coil coupled to said at least one rod;
 a first stationary power generating coil that interacts with said movable power generating coil at an upper position in an upward path of movement of said movable power generating coil;
 a second stationary power generating coil that interacts with said movable power generating coil at a lower position in a downward path of movement of said movable power generating coil to generate electricity which is conveyed through a cable to an electricity processing system;

whereby said movable power generating coil is lifted from the lower position to the upper position along said at least one rod at least partly via an external source.

18. The system of claim 17, wherein said at least one rod comprises a pair of rods, further comprising a respective sleeve bearing on each of said rods, a respective bracket connecting said movable power generating coil to each of said sleeve bearings, and a weight on said brackets.

19. The system of claim 17, wherein said movable power generating coil is connected to said at least one rod by a buoyant structure and the external source is a wave-based system wherein a wave causes the upward movement of said buoyant structure and thus said movable power generating coil.

20. The system of claim 17, wherein further comprising an electrically-powered lifting coil extending between said first and second stationary power generating coils, said lifting coil extending through said movable power generating coil and interacting with said movable power generating coil to contribute to lifting of said movable power generating coil from the lower position to the upper position.

* * * * *